May 5, 1942.   A. V. McFERRON   2,282,233
FISHING ROD
Filed Feb. 10, 1941

INVENTOR
ALFRED V. MC FERRON
BY
*Hyde and Meyer*
ATTORNEYS

Patented May 5, 1942

2,282,233

UNITED STATES PATENT OFFICE 2,282,233

FISHING ROD

Alfred V. McFerron, Rocky River, Ohio

Application February 10, 1941, Serial No. 378,213

2 Claims. (Cl. 43—20)

This invention relates to improvements in fishing rods and more particularly to a rod which is very cheap to make and very easy to handle and nevertheless one which has many of the desirable qualities of more expensive equipment.

One of the objects of the present invention is to provide a fishing rod formed almost entirely from a single piece of wire which is bent in an ingenious manner to provide a handle and a shaft for supporting a winding reel or spool.

Another object of the present invention is to provide in combination with a rod as above described a very inexpensive tip for the rod adapted to guide the line and an inexpensive and easily handled spool upon which the line may be wound.

Other objects and advantages of the present invention will be apparent from the accompanying drawing and description and the essential features will be set forth in the claims.

Figure 1:
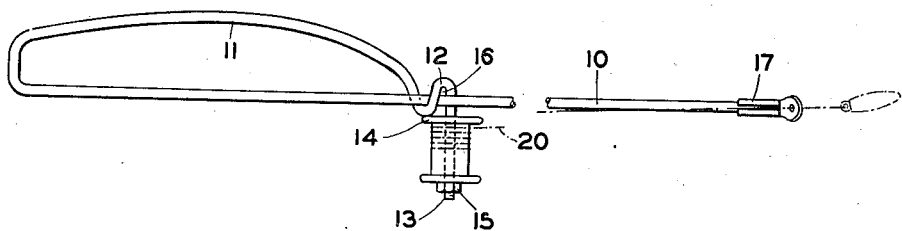
Figure 2:
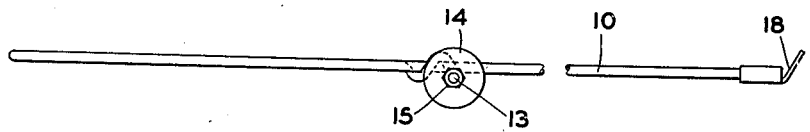

In the drawing, Fig. 1 is a plan view of one embodiment of my improved fishing rod; Fig. 2 is a side elevational view of the rod of Fig. 1; while Fig. 3 is an enlarged sectional view through the tip end of the rod of Fig. 2.

Inexpensive equipment available for fishing today comprises either a plain bamboo rod or other pole, or metal rods costing several dollars. One of the purposes of the present invention is to provide metal equipment having some of the whip and desirable casting characteristics of metal poles but at a price which is much cheaper than any equipment at present available. The rod here disclosed therefore is composed largely of a single piece of wire 10 preferably of 9 to 13 gauge but obviously of any weight desired. Preferably also the wire will have to some extent spring characteristics so as to provide a desirable whip or snap to the rod but here again this quality may obviously have a wide range of values. The wire 10 here disclosed has a straight pole portion and at one end, as at 11, the wire is bent back upon itself to provide a handle portion. Beyond the handle at 12 the wire is secured to the pole portion as for instance by twisting it about the pole as indicated in Figs. 1 and 2 and the free end of the wire as at 13 then extends substantially at right angles to the pole portion laterally to one side thereof so as to provide a supporting shaft for a winding spool 14. The end of the shaft 13 may be threaded to receive a nut 15 or the spool may be held on in any other suitable manner. If desired a slight clearance may be left at the point 16 where the wire is twisted about the pole portion so that a person with a small hand may grasp the handle 11 and squeeze the same so as to draw the sides of the handle toward each other thus providing a more comfortable grip.

Figure 3:
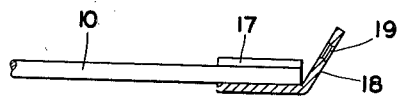

The tip end of the rod may be equipped in any suitable manner to guide the line, for instance as best seen in Figs. 1 and 3 a single piece of metal may have shank portions 17 bent around the tip end of the pole with an extending flange portion 18 bent over as shown and drilled at 19 to receive the line. Preferably the hole 19 is countersunk on both sides so as to guide the line with a minimum of friction.

The winding spool 14 may be of any suitable material and preferably is provided without any housing or crank handle so that the line indicated at 20 may be readily wound on the spool by grasping the handle 11 in the left hand, holding the thumb upon the spool flange and taking the line 20 in the right hand and winding it upon the spool. One may then use my improved rod for casting without tangling the line about the spool as often occurs with the customary reel and housing. In other words instead of the line winding backward upon the reel or becoming tangled, loops will fall freely from the open end of the spool without causing any difficulty.

Preferably the over all length of a rod formed according to my disclosure would be three to five feet in length but obviously this dimesion may be varied to suit the user. It is possible with this equipment to obtain casting results and pleasure in fishing comparable to that enjoyed where much more expensive equipment is used and yet the fishing rod here disclosed costs but a few cents to make.

What I claim is:

1. A fishing rod comprising a wire having a straight pole portion, said wire having a portion bent back upon itself to form a handle, a portion of said wire beyond said handle being secured to said pole portion, and the free end of said wire extending beyond said securing point substantially at right angles to said pole portion to form a shaft for a winding spool.

2. A fishing rod comprising a wire having a straight pole portion, said wire having a portion bent back upon itself to form a handle, a portion of said wire beyond said handle being twisted around said pole portion to secure it there, and the free end of said wire extending beyond said securing point substantially at right angles to said pole portion to form a shaft for a winding spool.

ALFRED V. McFERRON.